Oct. 20, 1970  E. SUTTER  3,535,534
DEVICE FOR STORING CONTROL INFORMATION
Filed March 23, 1967  4 Sheets-Sheet 1

INVENTOR
Egon Sutter
BY

Oct. 20, 1970  E. SUTTER  3,535,534
DEVICE FOR STORING CONTROL INFORMATION
Filed March 23, 1967  4 Sheets-Sheet 2

INVENTOR
Egon Sutter
BY
Walter Becker

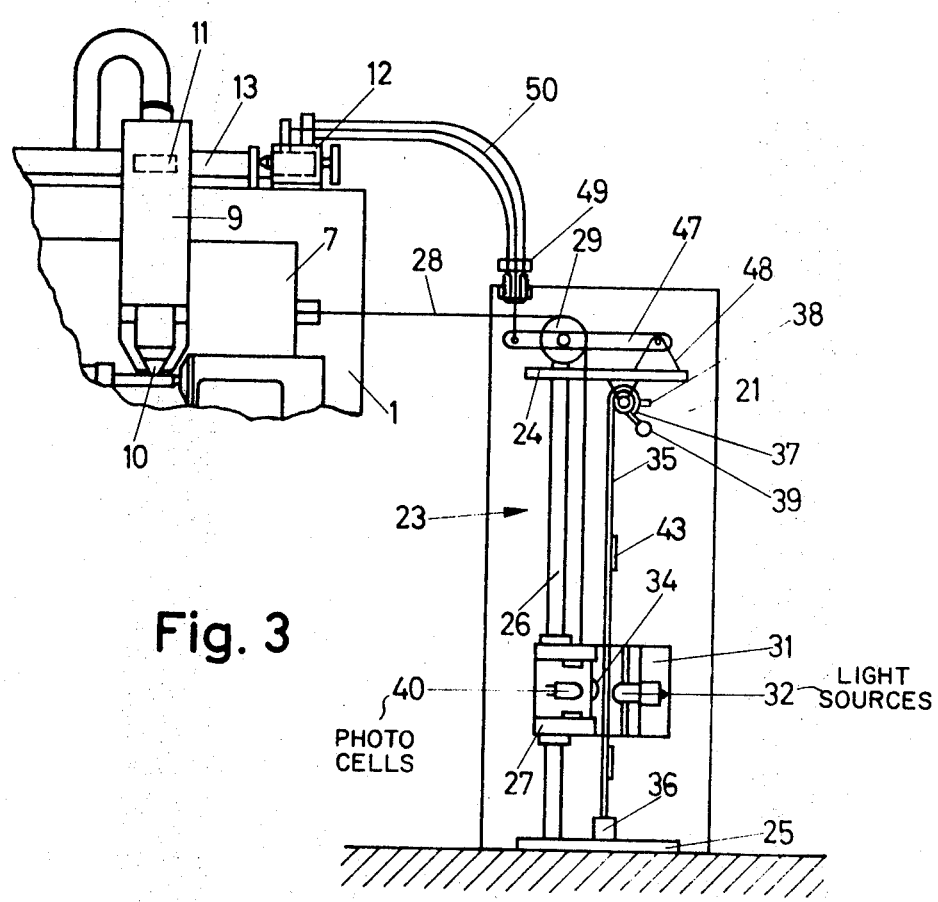

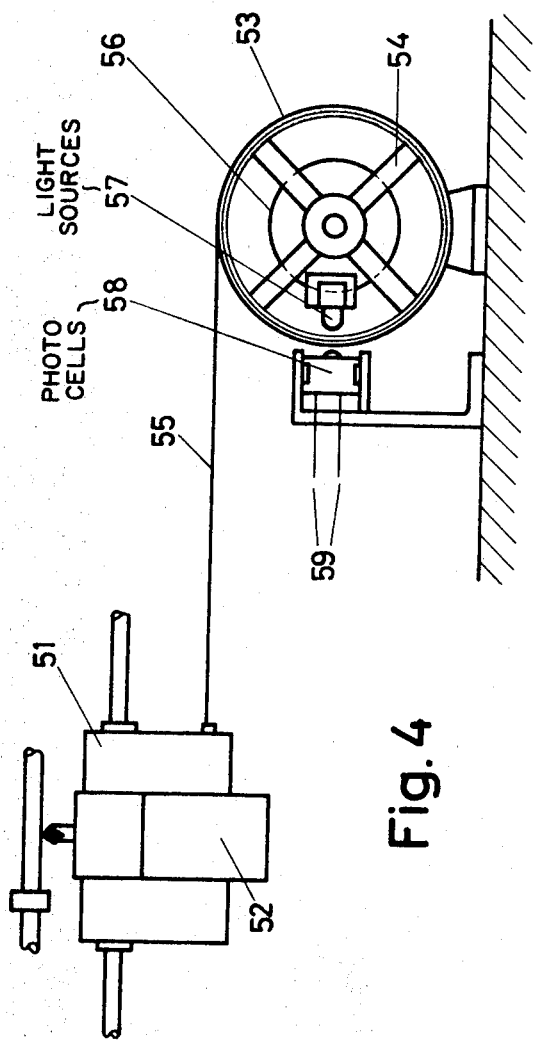

United States Patent Office 3,535,534
Patented Oct. 20, 1970

3,535,534
DEVICE FOR STORING CONTROL INFORMATION
Egon Sutter, Schaffhausen, Switzerland, assignor to Georg Fischer Aktiengesellschaft, Schaffhausen, Switzerland
Filed Mar. 23, 1967, Ser. No. 625,420
Claims priority, application Switzerland, Apr. 15, 1966, 5,527/66
Int. Cl. G08c 9/06
U.S. Cl. 250—219                           4 Claims

ABSTRACT OF THE DISCLOSURE

Device in which light from a light source is directed toward a photocell and is operable to cause control functions to be carried out for a movable member in which a control element is operable for interrupting the light and one of the control element and light sources together with the photocells is caused to move in unison with the movable member.

The present invention relates to a device for storing control information for the control of machine tools, in which the storing elements are adapted to be engaged in conformity with the position of at least one moved machine part.

For purposes of storing control information for a plurality of working operations for semi-automated and fully automated machine tools, it is known to provide a cam control. This cam control comprises cam rails arranged in the form of a cam rail field and carrying adjustable cams. A carrier fixedly connected with a movable part of the machine tool, for instance a carriage, is equipped with cam switches corresponding to the number of rails. When the switch moves over the cams, the latter are actuated and in this way produce stroke-dependent control orders, for instance for the switching-off and switching-over of drives, advancing movements, or the like. The adjustment of the cams in the rail fields is a time consuming operation if the required precision tolerance is to be maintained. The stocking of prepared rail fields is expensive and requires considerable space. The cams are subjected to wear so that they have to be replaced after a certain time of use.

It is an object of the present invention to provide a device for storing control information, which will overcome the above mentioned drawbacks of the heretofore employed cam control.

It is another object of this invention to provide a device as set forth in the preceding paragraph, which is relatively simple in construction and reliable in operation.

These and other objects and advantages of the invention will appear more clearly from the following specification in connection with the accompanying drawings, in which:

FIG. 3 represents a cutout of a copying turning machine with a further developed information storing device according to the invention.

FIG. 4 represents still a further embodiment of the storing device according to the invention.

The device according to the present invention is characterized primarily by a carrier which is adapted for producing control signals to be partially covered. This carrier which is transparent is arranged in the path of the beams of at least one light source directed toward a light sensitive element. The light source and the light sensitive element are displaceable relative to the carrier by means of a power connection to the moved machine part.

Figure 1:
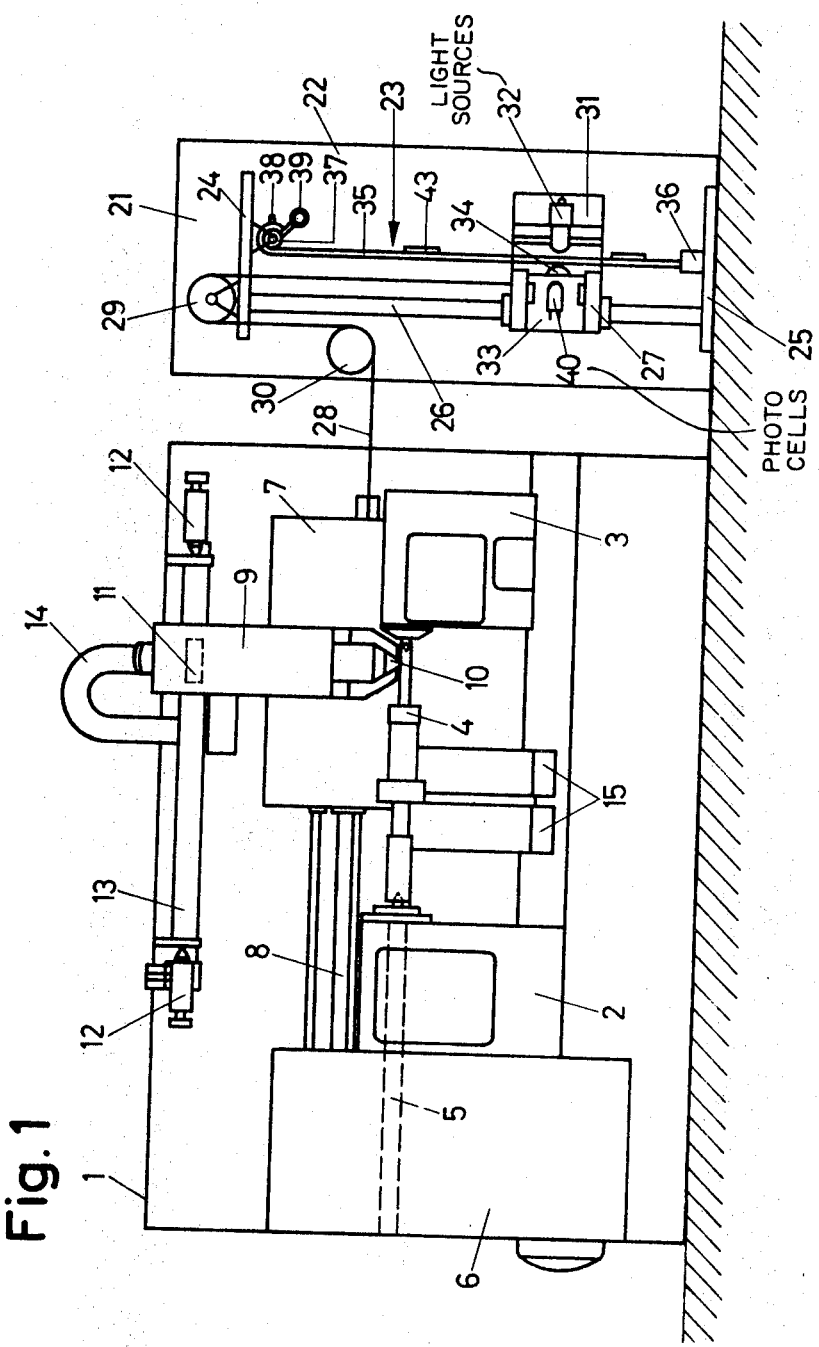
FIG. 1 is a semischematic view of a copying turning machine with a switch information storing device according to the present invention.

Referring now more specifically to FIG. 1, this figure illustrates a copying turning machine with a spindle head 2 and a tailstock 3 between which a work piece 4 is clamped. A main spindle 5 for rotating the work piece 4 is coupled to a drive mounted in a gear box or control box 6. A feeding carriage 7 driven by a shaft 8 is displaceable along the work piece 4. The feeding carriage 7 carries a copying carriage 9 which is displaceable in a direction transverse to the axis of rotation of the work piece 4 while at one end of said carriage 9 there is provided a turning tool 10. Carriage 9 is furthermore equipped with a feeler 11 (diagrammatically indicated only) which during the movement of the feeding carriage 7 slides along a templet 13 clamped between two carriers 12. Said feeler 11 controls for instance a hydraulic copying mechanism mounted on the copying carriage. The arrangement furthermore comprises control conduits 14 which lead from the copying carriage 9 to a central program control unit which is mounted in or on the turning machine 1. Furthermore, by way of example, there are provided two additional plunge cut carriages 15.

Figure 2:
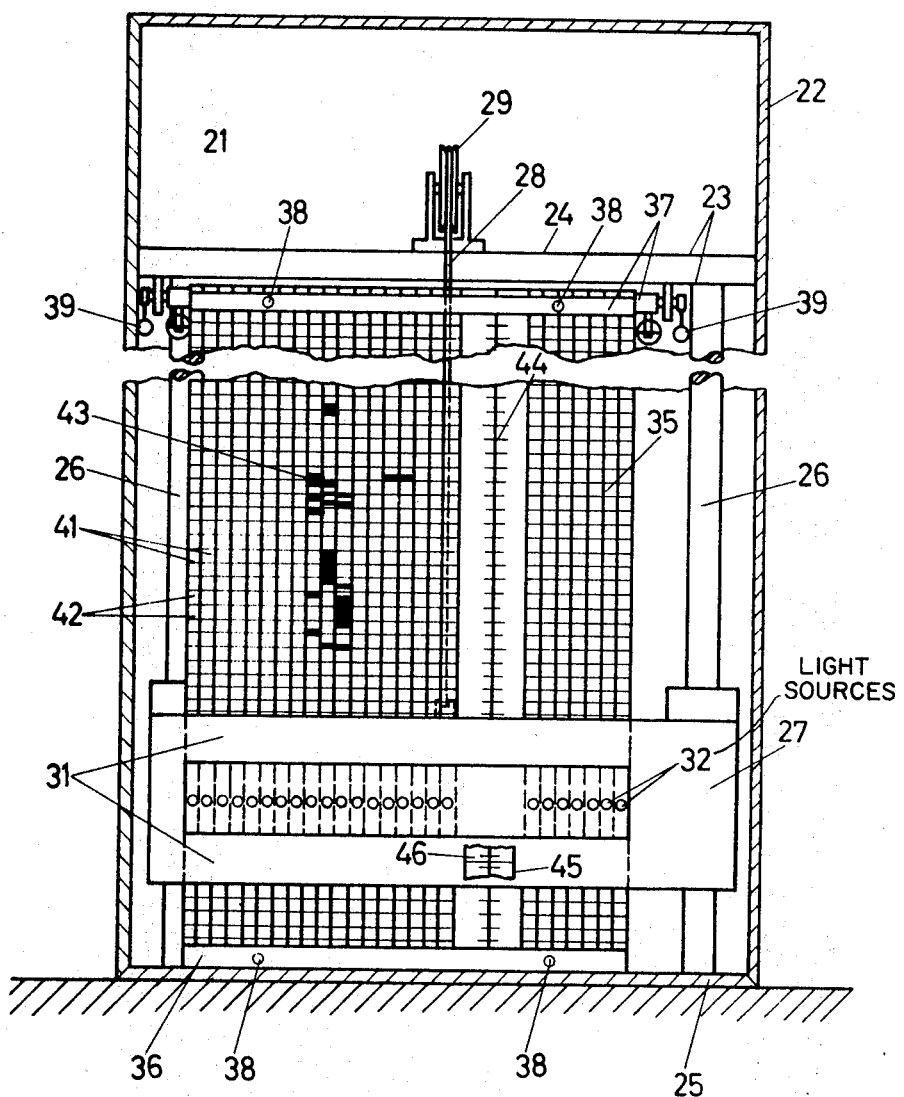
FIG. 2 is a front view of the storing device shown in FIG. 1.

Whereas heretofore known machine tools, especially copying turning machines, are provided with a plurality of cam rail fields for storing control information, in which fields displaceable cams are adjusted in conformity with the type and duration of the desired movement, while contact switches sliding over said cam rails in conformity with the movement of the feeding carriage, copying carriage, etc., at the proper moment release the desired movement, the described turning machine 1 has a control information storing device 21 which is connected to the side of the machine or mounted alongside the turning machine 1. The storing device 21 is shown in FIG. 1 in side view and is shown in FIG. 2 in front view.

A housing 22 adapted to keep out dust and dirt contains a frame 23 provided with an upper horizontal supporting plate 24 and with two vertical guiding rails 26 connected to the foundation or a floor plate 25. These rails 26 may for instance have a circular cross section. A carriage 27 is adapted to slide on said guiding rails 26. For purposes of moving the carriage 27 in upward and downward direction, said carriage 27 is equipped with power transmitting means 28, for instance a cable, a chain drive, or a pinion and rack drive. This power transmission may also be effected directly frame shaft 8 to carriage 7 through the intervention of a gear transmission. The cable 28 is passed over a first roller 29 connected to the supporting plate 24 and over a further reversing roller 30 and is in a suitable manner connected with the feeding carriage 7. In view of its weight, the carriage 27 holds cable 28 taut so that horizontal movement of the feeding carriage 7 will cause movement of carriage 27 in vertical direction along the guiding rails 26 inasmuch as it is carried along by the feeding carriage 7.

Carriage 27 has its outer side provided with longitudinal carriers 31 between which there is arranged a number of light sources 32, for instance incandescent lamps, directed toward the inside and arranged alongside each other in a horizontal plane at uniform distances.

In a further section 33 of carriage 27 there are arranged in the same horizontal plane and at a slight distance from the light sources 32 light sensitive elements 40, as for instance electric cells. The arrangement is such that one electric cell 40 is located opposite a light source 32. The light of the incandescent lamps 32 is by means of lenses 34 focused onto electric cells 40. In addition thereto, the part 33 may house structural elements, such as amplifiers for the electric current, relays, etc. The electric connections from the individual electric cells 40 or the amplifiers and relays pertaining thereto with the central program control units are not illustrated.

In the gap between the incandescent lamps 32 and the lines 34 there is inserted a transparent foil 35 which extends over the entire length of the incandescent lamp assembly. Foil 35 is on one hand detachably connected on the floor plate 25 with a clamping device 36 and on the other hand is subjected to pull by means of an upper clamping device 37 mounted on the supporting plate 24. For purposes of uniformly clamping the foil 35, the upper roller-shaped clamping device 37 may be equipped with springs not shown. For purposes of insertion of foil 35, both clamping devices 36 and 37 are provided with pins 38. Furthermore, the upper clamping device 37 is adapted by means of handles 39 to be turned against the thrust of the employed springs so that the foil 35 can without difficulties be suspended loosely or be removed.

Foil 35 is subdivided into longitudinal tracks 41, while the defining lines extending in the longitudinal direction may for instance be printed upon or may have been produced by a photographic process on said foil. The spacing and width of the longitudinal tracks 41 corresponds to the position of the light sources 32 and electric cells 40. Moreover, the foil is subdivided into transverse tracks 42 the width of which corresponds to a certain stroke of the advancing carriage 7, said width for instance being selected in conformity with a fixed metric measurement.

Each longitudinal track 41 of foil 35 or light source 32 and electric cell 40 between which said longitudinal tracks are located has associated therewith a certain control operation, for instance a change in the speed of the main spindle 5, a change in the feeding speed of the feeding carriage 7, a switching-on and switching-off of a cooling and lubricating medium, etc. The control order or impulse is produced by moving a non-transparent cover strip 43 into the corresponding longitudinal track 41 at that area of the feeding carriage 7 ascertained by the transverse tracks 42 at which a certain movement is to be initiated. This cover strip 43 may for instance be an adhesive strip which has the width of a longitudinal track 41 and which consequently can in a simple manner be adhesively placed upon the foil 35. If now the carriage 27 is moved along by the feeding carriage 7 of the turning machine 1 and is moved over such covered area of foil 35, the sharply bundled light beam of the respective longitudinal track is interrupted in a manner known per se so that the electric cell 40 located behind said foil 35 will no longer be illuminated. The drop of the current in the photoelectric cell to zero or a value close thereto can produce, for instance through an amplifier and a relay, a control impulse for initiating the desired movement. The extension of the cover strip in the longitudinal direction of the track 41 will determine the length of time of the primary photoelectric cell 40 produced control signal with regard to the stroke performed by the feeding carriage 7 per time unit.

Consequently, the device according to the present invention makes it possible, independently of the use of the machine tool, by gluing cover strips 43 onto the various tracks of foil 35 at any desired time preceding the machining of the work piece, to preset the entire control program of the machine tool. When the machining is to be carried out, foil 35 is by a few operational steps clamped into the information storing device 21. Additional operations with the exception of a zero point adjustment to be described further below are not necessary. After completion of a series of work pieces of any desired number, the foil can again be removed and can be stored for later use for the same machining operation. The control information contained on the foil and determined by the location and length of the cover strips 43 thus, in contrast to the heretofore known devices operating with cam rails and cam switches, can be stored for any length of time. The number of the simultaneously called up control information, i.e. the number of the longitudinal tracks 41 arranged parallel to each other on foil 35 and the number of the corresponding light sources and photoelectric cells is practically unlimited. Thus, for instance, twenty-four light sources 32 and photoelectric cells 40 may be arranged adjacent to each other. The precision at which a control impulse is initiated, is less than +0.5 millimeter.

According to FIGS. 1 and 2, the movement of the carriage 27 is effected in conformity with the feed carriage 7. Of course, in the same manner simultaneously control information can be stored and called off in conformity with other movable parts of the machine tool, for instance in conformity with the copying carriage 7 of the turning machine 1, or with the plunge-cut carriage 15. To this end, the storing device 21 has a plurality of guiding rails 26 arranged in pairs in the same frame 23. Between said rails 26 there is provided a carriage 27 each on which is mounted a corresponding number of light sources and photoelectric cells. Each carriage is through a separate cable connected to the corresponding movable part of the turning machine, for instance the feeding carriage 7, the copying carriage 9, and the plunge-cut carriage 15. On the other hand, however, the design of the foil 35, which consists of a single piece for the storing of all control information, and also the design of the clamping device remains the same.

In order to be able to check whether, after the clamping-in of a foil 35, the location of carriage 27 with regard to the foil is in conformity with the location of that part of the turning machine which carries along the carriage, thus for instance of the feeding carriage 7, the foil 35 is, as is evident from FIG. 2, provided with an additional scale 44. By means of an opening 45 provided in the carriage 27 and a marker 46, the location of carriage 27 with regard to foil 35 can be ascertained at any time. In particular, it is possible in this way to ascertain whether the marker 46 coincides with a zero point of the scale 44 when the feeding carriage occupies its starting position. If there should be discovered a deviation in this respect, the further development of the information storing device 21 illustrated in FIG. 3 permits to effect a zero point correction.

According to FIG. 3, the carriage 27 slidable along two guiding rails 26 is again through the intervention of a cable 28 connected with the feeding carriage 7 of the copying turning machine 1. The reversing roller 29 is in the illustrated embodiment, in contrast to FIGS. 1 and 2, not fixedly mounted on supporting plate 24 but instead is mounted on a lever 47 one end of which is by means of a support 48 pivotally mounted on supporting plate 24. By means of a diagrammatically shown screw device 49, lever 47 and consequently through the intervention of roller 29 also carriage 27 is adjustable as to height with regard to foil 35. In order to be able to adjust the carriage 27 in conformity with the location of the templet 13 sensed by copying carriage 9, an operative connection is established, for instance a bowden wire 50, between the free end of lever 47 and the longitudinally displaceable tail spindle of one carrier 12 of templet 13. It is obvious that the control devices actuated by the signals emitted by the photoelectric cells comprise the necessary control arrangements in order to stop the turning machine if an interruption of the current should occur in the circuit of the light sources, photoelectric cells and amplifiers pertaining thereto, or if one of these elements should fail. Thus, for instance, all incandescent lamps 32 may be arranged in series so that when one of the lamps fails, all lamps will extinguish thereby bringing the turning machine to an emergency stop.

There also exists other possibilities movably to arrange a transparent carrier between a light source and a light sensitive element which carrier is partially to be covered for producing control signals. Such other possibilities are shown in FIG. 4. In this figure only the base carriage 51 and the copying carriage 52 arranged there have been shown. A foil 55 is in a known manner clamped upon the surface of a drum 54. A cable 55 passes over the circumferential surface of the drum 54 and has its ends respectively connected to the feeding carriage 51 and a fixed point of drum 54. A spring mechanism 56 imparts upon drum 54 a torque in order to hold the cable 55 in taut condition. In the interior of drum 54 there is provided a series of light sources 57 arranged alongside each other. These light sources 57 are faced by photoelectric cells 58 outside the drum 54. The light sources 57 and cells 58 are stationary. The electric impulses of the photoelectric cells are conveyed through electric lines 59 to the electric control of the turning machine. The operation of this device is the same as described in connection with FIGS. 1 and 2. The difference consists merely in that with the arrangement of FIG. 4 the reading of control information is effected by a stationary device 57, 58, while the foil 53 moves synchronously with that portion of the machine tool 51 which is intended to release the control information. Advantageously, the mantle of drum 54 is produced of transparent material. When using non-transparent material, it would be necessary to provide corresponding perforations for each light source.

The advantages of the devices according to the present invention consist primarily in that the foils are inexpensive and can easily be stored while requiring little space. The adjustment of the control points can also be effected outside the machine in a precise manner so that it can be effected easier than the preparation of a rail field equipped with cams.

It is, of course, to be understood that the present invention is, by no means, limited to the particular arrangements shown in the drawings but also comprises any modifications within the scope of the invention.

What is claimed is:

1. A device for storing control information readable dependent upon position of a movable carriage relative to storage elements for the control of a machine tool having at least one movable carriage means and comprising: a stationary frame, at least one carriage shiftable relative to said stationary frame, pliable power transfer means which establish simultaneously shiftable interconnection between said movable carriage means of the machine tool and said one carriage shiftable relative to said stationary frame, a foil sheet of transparent synthetic material adjustably clamped to said stationary frame, opaque cover strip means secured to said foil sheet in particular locations to provide independently triggered control information signals, plural light sources arranged one upon another on said carriage, and light sensitive elements each upon a side of said foil sheet opposite to said plural light sources, said opaque cover strip means interrupting beam passage individually from said light sources relative to respective said light sensitive elements in predetermined relative positioning of said carriage with respect to said stationary frame.

2. A device according to claim 1, in which said stationary frame guides said carriage in vertical direction.

3. A device according to claim 1, in which plural movable carriage means are movable respectively relative to said carriage shiftable in vertical direction and said foil sheet is clamped vertically in spaced locations.

4. A device according to claim 1, in which a cable forms said pliable power transmitting means, a lever is pivotally secured to said stationary frame, a roller is journalled by said lever and guides said cable, and lever-adjusting means are provided for shifting said lever and thereby shifting said carriage into a null point setting.

References Cited
UNITED STATES PATENTS

| | | | |
|---|---|---|---|
| 2,398,238 | 4/1946 | McNatt | 250—219 X |
| 2,948,817 | 8/1960 | Carpenter | 250—231 |
| 3,040,603 | 6/1962 | Benton | 250—231 X |
| 3,350,715 | 10/1967 | King et al. | 250—219 X |

WALTER STOLWEIN, Primary Examiner

U.S. Cl. X.R.

250—234